March 31, 1942.   W. H. LANNERT   2,278,178
STRAINER
Filed Dec. 23, 1939
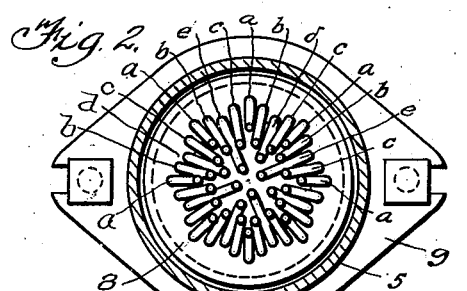
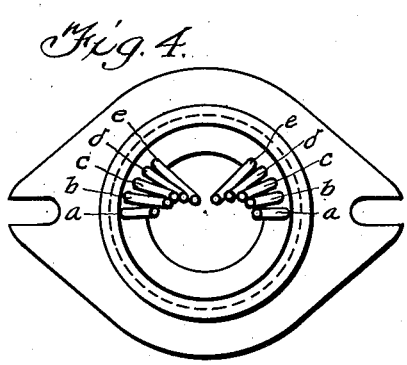
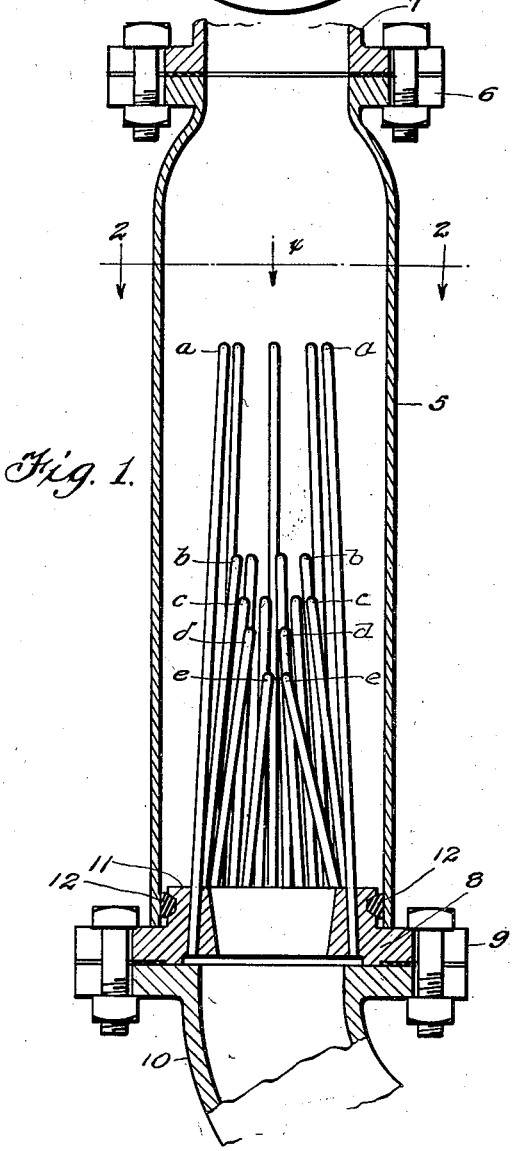
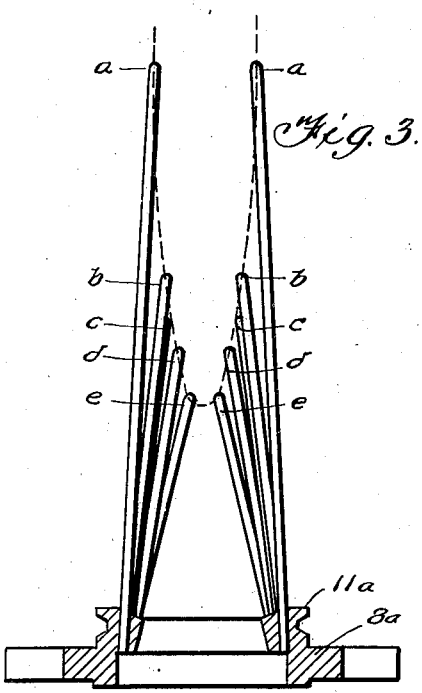
INVENTOR.
WILLIAM H. LANNERT,
BY Charles O. Shurvey
his ATTORNEY.

Patented Mar. 31, 1942

2,278,178

UNITED STATES PATENT OFFICE 2,278,178

STRAINER

William H. Lannert, Chicago, Ill., assignor to Chicago Pump Company, Chicago, Ill., a corporation of Illinois Application December 23, 1939, Serial No. 310,672

8 Claims. (Cl. 210—164)

This invention relates to strainers. One of the objects of this invention is to provide improved means for detaining solids, such as are carried by sewage or by other liquids, permitting the strained liquids to pass on. The present invention has reference more particularly to that type of strainer through which the direction of the flow is reversed occasionally or frequently, whereby the detained solids may be flushed out of the strainer and carried away by the liquid when the flow is reversed.

An application of the present type of strainer is disclosed in Letters Patent No. 1,785,480 issued to A. C. Durdin, Jr., December 16, 1930, for improvements in "Pumping apparatus for sewage and other liquids," and also in my pending application for patent on Duplex pumping apparatus, Serial No. 301,386, filed October 26, 1939, to which reference may be had for a fuller understanding of one of the uses to which the present strainers are put.

Another object of the present invention is to increase the efficiency of strainers of this type.

Another object is to prevent clogging of the strainer, and to insure the discharge of the detained solids when the direction of flow is reversed. Another object is to eliminate a foraminous or other perforated wall for separating solids from liquids, as these forms of strainers are very likely to become clogged.

Another object is to simplify and otherwise improve upon strainers of the present type.

With these and other objects and advantages in view, this invention consists in the several novel features hereinafter fully set forth and claimed.

The invention is clearly illustrated in the drawing accompanying this specification, in which Fig. 1 is a central vertical section through a strainer embodying a simple form of the present invention.

Fig. 2 is a horizontal section taken on the line 2—2 of Fig. 1.

Fig. 3 is a diagrammatic view in elevation of a modified arrangement of the straining element, showing the application thereof to a slightly modified form of base or support, the base being shown in central vertical section, and Fig. 4 is a plan of the parts seen in Fig. 3.

Referring to said drawing and first to Figs. 1 and 2, inclusive, which illustrate one embodiment of the present invention, the reference character 5 designates a shell or casing wall, preferably of cylindrical form, which surrounds the straining element. The upper end of the shell is open and said upper end is provided with a bolting flange 6, to which may be bolted a pipe 7, through which liquids containing solids flow to the strainer and through which they are discharged therefrom. The lower end of the shell is secured to a base 8, which may be provided with a bolting flange 9, adapted to be bolted to a pipe 10, through which strained liquids pass from the strainer as to the discharge side of a centrifugal pump, as seen in my pending patent application above referred to, or said pipe 10 may be connected to any means for reversing the flow through the strainer. The shell 5 may be connected to the base 8 in any suitable manner, and it is here shown as connected to a neck 11 thereof, by a slip joint, a gasket 12 being seated in an annular groove in the neck 11 and bearing tightly against the inner face of the shell.

Rigidly secured to the neck 11, around the opening therein, is a multiplicity of fingers, a, b, c, d, e, which incline toward the axis of the opening, some of said fingers approaching the axis more closely than others, the purpose of which will be presently explained. The fingers may be in the nature of wire rods, bars, strips or the like, with their lower ends securely fastened in the base 8, in any suitable manner. Some of the fingers are shorter than others, and extend in the spaces between the longer fingers, so as to reduce the spaces between the longer fingers to form narrow, elongated slots, through which the liquids discharge from the strainer when flowing in either direction.

In the form of the invention illustrated in Figs. 1 and 2, flexible rods are used to form the straining element. Desirably the upper ends of the rods are rounded to prevent unnecessary tearing of rags, paper and the like. The longest rods, a, incline from the base towards the axis of the opening in the neck thereof, at a slight angle, so as to leave a relatively wide central space between their upper extremities. For convenience in spacing the several rods about the axis of the strainer, eight of the longest rods are used, these rods being spaced equidistantly around the opening in the neck. Intermediate the longer rods are shorter rods, b, c, d, e, of graduated lengths, which incline at greater angles to the axis than the longest rods, the angle of inclination of the rods increasing from the longest to the shortest rods. The shortest rods, e, have the greatest angle of inclination towards the axis of the strainer. If desired, the fixed ends of certain of the rods may be located in a circle concentric with the axis of the strainer, and the fixed ends of the other rods may be located in other circles concentric therewith as is illustrated in Fig. 2, although this arrangement is not material to the invention broadly considered.

By reference to Fig. 1, and also to Fig. 3, which is merely diagrammatic, it will be seen that the rods form a crater-like arrangement having an open space, wide at its top and narrow at the bottom. Rags, paper and stringy, fibrous materials flowing down through the strainer are caught by the rods, some of the solids entering the crater and being caught by the upper ends of the rods, and other solids being caught on the outer side of the straining element. However, by reason of the multiplicity of slots between the rods, the liquids freely flow through the straining element, separated from the detained solids.

In Fig. 3 the opening through the neck 11a of the base 8a flares towards the discharge end of the base and the inner marginal edge of the top of the neck slopes downward towards the flared part of the opening. For the purposes of illustration, some of the rods are omitted and others spaced as shown in Fig. 4.

In use, sewage or other liquids containing solids flow through the strainer in the direction of the arrow x, in Fig. 1, and the solids are caught by the inclined rods and are separated from the liquid, which is permitted to flow through slots between said rods. When the flow is reversed, the liquids carry the detained solids along with them, and in case any solids have become wedged between any of the flexible rods, the latter yield readily under the influence of the flowing liquid, permitting the wedged solids to free themselves.

One of the more important uses of a strainer of the present type is in connection with pumping apparatus, as shown in the patent and application above referred to, but it is to be understood that its use is not limited thereto. As in the disclosures of said pending application, the pipe 7 may connect with an inlet pipe (not shown) which contains a check valve opening toward the pipe 7, and the latter pipe may connect with a discharge pipe, or the strainer may be inverted and the bolting flange 6 bolted to an inlet pipe, with the other end of the strainer discharging into a receptacle. In the event of an overflow from the inlet pipe through the strainer, the solids are intercepted by the straining element thereof and are flushed out of the strainer when the flow reverses and flows back through the strainer.

I claim as new and desire to secure by Letters Patent:

1. A strainer comprising a casing through which liquids may flow in either direction, said casing having an opening at one end through which liquids carrying solids enter and discharge from the casing, and an opening at the other end through which strained liquids discharge from and re-enter the casing, a straining element composed of inclined fingers of different lengths arranged around a common axis in said casing and inclining towards said axis and toward said first named opening from points disposed adjacent and laterally of said second named opening, and means for supporting the fingers in the casing adjacent and around said other opening with the free extremities of the longer fingers spaced further from said axis than the free extremities of the shorter fingers.

2. A strainer comprising a casing through which liquids may flow in either direction, said casing having an opening at one end through which liquids carrying solids enter and discharge from the casing, and an opening at the other end through which strained liquids discharge from and re-enter the casing, a straining element composed of inclined fingers of different lengths arranged around a common axis in said casing and inclining towards said axis and toward said first named opening from points disposed adjacent and laterally of said second named opening, and means for supporting the fingers in the casing adjacent and around said other opening with the shorter fingers inclining at a greater angle to the axis of the straining element than the longer fingers.

3. A strainer comprising a casing having an opening at one end through which liquids carrying solids enter and discharge from the casing, and an opening at the other end through which strained liquids discharge from and re-enter the casing, several series of rods of different lengths arranged around a common axis in the casing, and inclining towards said axis and toward said first named opening from points disposed adjacent and laterally of said second named opening, and means to support said rods in the casing adjacent and around said other opening with the extremities of the series of longer rods spaced further away from said axis than the free extremities of the series of shorter rods.

4. A strainer comprising a casing having an opening at one end through which liquids carrying solids enter and discharge from the casing, and an opening at the other end through which strained liquids discharge from and re-enter the casing, several series of rods of different lengths, arranged around a common axis in the casing and inclining towards said axis and toward said first named opening from points disposed adjacent and laterally of said second named opening, and means to support said rods in the casing adjacent and around said other opening with the shorter rods inclining at a greater angle to the axis than the longer rods.

5. A strainer comprising a casing through which liquid may flow in either direction, and having an opening at one end through which liquid containing solids enters and discharges from the casing, a rod supporting base at the other end of the casing, said base having an opening therethrough through which strained liquids discharge from and re-enter the casing, and several series of rods, those of each series being of a length different from those of the other series, all of said rods being anchored at one end in said base and arranged around the axis of the opening therein, and inclining toward said axis and toward the first mentioned opening, with the free extremities of the series of longer rods spaced further away from said axis than the free extremities of the series of shorter rods, the rods of the several series providing slots between them, through which liquid may pass in either direction through the strainer.

6. A strainer comprising a casing through which liquid may flow in either direction, said casing having an opening at one end through which liquids carrying solids enter and discharge from the casing, and an opening at the other end through which strained liquids discharge from and re-enter the casing, a plurality of flexible, spaced rods of different lengths, arranged around a common axis in the casing, with the lower ends of the longest rods disposed in one circle, and the lower ends of the shorter rods disposed in concentric smaller circles, and all of the rods inclining toward said axis and toward said first named opening from points disposed adjacent and laterally of said second named opening, said spaced rods providing slots between them through which liquids may flow, and supporting means adjacent the second named opening to which the lower ends of the rods are securely fastened, the other ends being free to permit flexing of the rods.

7. A strainer comprising a casing through which liquids may flow in either direction, said casing having an opening at one end through which liquids carrying solids enter and discharge from the casing, and an opening at the other end through which strained liquids discharge from and re-enter the casing, and a plurality of flexible spaced rods securely supported at one end around the second named opening, said rods being arranged around a common axis in the casing in the form of a plurality of longitudinally slotted cones, the rods being of various lengths, and the longest rods being equidistantly spaced apart at their supported ends, shorter rods being equidistantly spaced and disposed between the longest rods, and the shortest rods being equidistantly spaced and disposed between the longest and shortest rods.

8. A strainer comprising a casing through which liquids may flow in either direction, said casing having an opening in one end through which liquids, carrying solids, enter and discharge from said casing, and an opening in its other end, through which strained liquids discharge from and re-enter the casing, a straining element composed of fingers of different lengths arranged with the shorter fingers disposed between longer ones, all of said fingers extending around a common axis towards the first mentioned opening from points disposed adjacent and around the second named opening and inclining toward the axis of the casing.

WILLIAM H. LANNERT.